United States Patent [19]

Paulson et al.

[11] E Re. 30,703

[45] Reissued Aug. 11, 1981

[54] BALL THROWING DEVICE WITH ROTARY WHEEL, AND PAD MEANS FOR COMPRESSING A BALL AGAINST THE WHEEL

[75] Inventors: John K. Paulson, Lake Oswego; Walter J. Steffan, Portland, both of Oreg.

[73] Assignee: JoPaul Industries, Inc., Tualatin, Oreg.

[21] Appl. No.: 43,480

[22] Filed: May 29, 1979

Related U.S. Patent Documents

Reissue of:

[64] Patent No.: 4,080,950
Issued: Mar. 28, 1978
Appl. No.: 724,022
Filed: Sep. 16, 1976

U.S. Applications:

[63] Continuation-in-part of Ser. No. 554,920, Mar. 3, 1975, abandoned.

[51] Int. Cl.[3] ..... F41B 15/00

[52] U.S. Cl. ..... 124/1; 124/81; 124/49; 273/26 D

[58] Field of Search ..... 124/81, 78, 82, 29, 124/6, 41 R, 1; 273/26 D

[56] References Cited

U.S. PATENT DOCUMENTS

| | | | |
|---|---|---|---|
| 14,106 | 4/1916 | Palmer | 124/29 |
| 1,211,738 | 1/1917 | Marty | 124/78 X |
| 2,705,945 | 4/1955 | Cavalier | 124/6 |
| 3,794,011 | 2/1974 | Newgarden | 124/78 |
| 3,878,827 | 4/1975 | Newgarden | 124/81 |
| 4,026,261 | 5/1977 | Paulson et al. | 124/78 |
| 4,197,827 | 4/1980 | Smith | 124/78 |

*Primary Examiner*—William R. Browne
*Attorney, Agent, or Firm*—Kolisch, Hartwell & Dickinson

[57] ABSTRACT

A ball is delivered into the constricted space between, and thereby gripped frictionally by, a fixed pad and a confronting surface of a wheel which is driven at a speed predetermined to propel the ball therefrom at a selected velocity. The line on which the ball is propelled between the pad and wheel is adjustable about a horizontal axis and the speed of the wheel is variable so as to adjust the trajectory of the thrown ball. Further, the pad may be mounted above or below the wheel to reverse the spin on the ball and thus afford a variety of practice conditions.

8 Claims, 5 Drawing Figures

BALL THROWING DEVICE WITH ROTARY WHEEL, AND PAD MEANS FOR COMPRESSING A BALL AGAINST THE WHEEL

Matter enclosed in heavy brackets [ ] appears in the original patent but forms no part of this reissue specification; matter printed in italics indicates the additions made by reissue.

REFERENCE TO RELATED APPLICATION

This application is *for the reissue of my patent No. 4,080,950, issued Mar. 28, 1978, on application Ser. No. 724,022 filed Sept. 16, 1976, which was* a continuation-in-part of our earlier application, Ser. No. 554,920 filed 3 Mar., 1975, now abandoned.

BACKGROUND OF THE INVENTION

This invention relates to devices for throwing baseballs, softballs, tennis balls and the like, and more particularly to a simplified and economical device for throwing such balls in a straight vertical plane.

Ball throwing devices have been utilized heretofore. For example, they have been used by tennis players to enable practice without the necessity of another player. They have also been used by baseball players for batting practice to avoid overworking the arms of pitchers and for practice in fielding grounders and flies.

However, ball throwing devices provided heretofore are characterized by complex and costly constructions, necessitated by the desirability that the device be able to throw curve balls.

On the other hand, there are many situations in which there is no need for the throwing of curve balls. Such circumsances include baseball batting practice for youngsters below high school level; all levels of softball batting practice; all levels of ground ball and fly ball fielding practice; most forms of tennis practice, and others. Accordingly, for these many circumstances the excessive cost of more sophisticated ball throwing devices is not justified.

One such relatively simplified type of ball throwing device is known. However, it is not readily portable, it requires a reversible drive, the ball feed mechanism is usable in only one position of ball delivery adjustment, and the direction of ball delivery is inconsistent.

SUMMARY OF THE INVENTION

In its basic concept, the ball throwing device of this invention involves the momentary frictional gripping of a ball between the spaced surfaces of a fixed pad and a rotating wheel driven at a speed predetermined to effect the throwing of the ball at a desired velocity.

It is by virtue of the foregoing basic concept that the principal objective of this invention is achieved; namely to overcome the aforementioned structural complications and costs associated with prior ball throwing devices.

Another important object of this invention is the provision of a ball throwing device of simplified and economical construction, which is compact in size and light in weight for easy transport.

A further important object of this invention is to provide a ball throwing device which is adaptable for use with baseballs, softballs, tennis balls and the like, for straight ball throwing.

The foregoing and other objects and advantages of this invention will appear from the following detailed description, taken in connection with the accompanying drawings of preferred embodiments.

DESCRIPTION OF THE PREFERRED EMBODIMENTS

Figure 1:
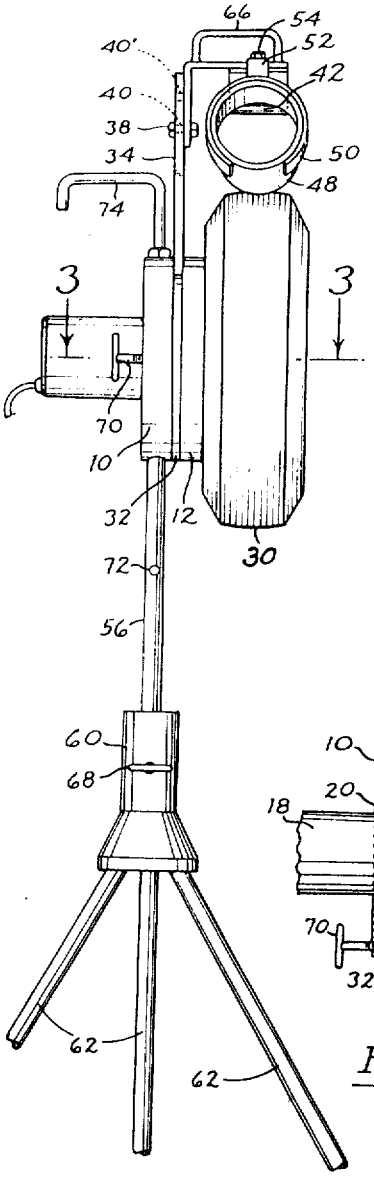
FIG. 1 is a fragmentary view in rear elevation of a ball throwing device embodying the features of this invention.
Figure 2:
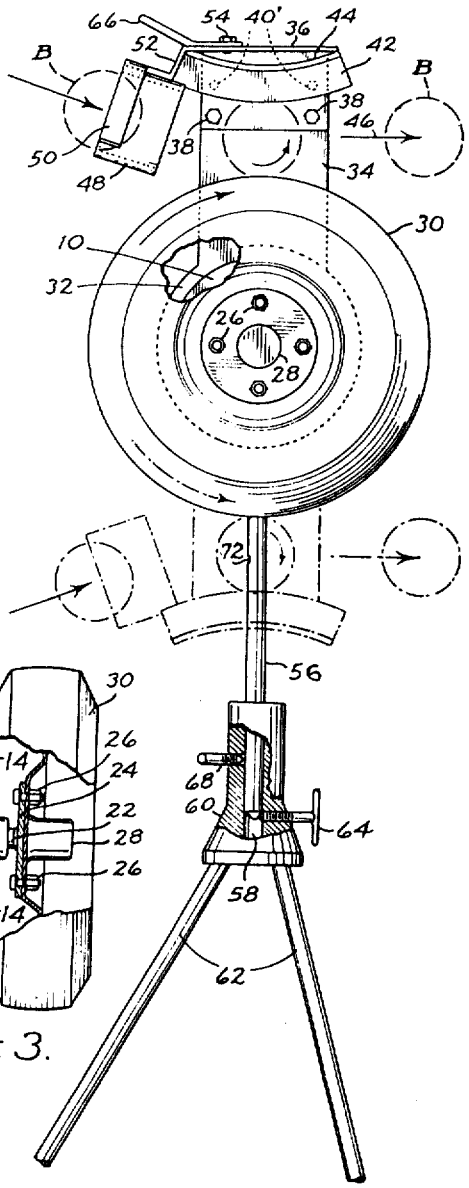
FIG. 2 is a fragmentary view in side elevation as viewed from the right of FIG. 1, portions being broken away to disclose internal construction features.
Figure 3:
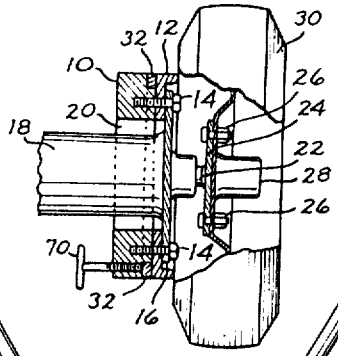
FIG. 3 is a fragmentary sectional view taken on the line 3—3 in FIG. 1.

The ball throwing device illustrated in FIGS. 1-3 includes a support assembly which includes a base member preferably in the form of a pair of annular *base* sections 10 and 12 disposed in abutting relationship and secured together detachably by such means as screws 14 (FIG. 3). Conveniently, these screws also serve to secure to the base member the mounting flange 16 of an electric drive motor 18 which projects through the central opening 20 in the base sections. The output shaft 22 of the motor mounts a flange 24 to which is removably secured, as by means of bolts 26, the hub 28 of a *ball-engaging* wheel *or wheel member* which [mounts] *includes* a pneumatic tire 30 *having a ball-engaging surface extending circumferentially thereabout. The wheel member, as illustrated, occupies a substantially upright plane.* The motor is of the variable speed type whereby variation in the rotational speed of the wheel 30 allows balls to be thrown over a wide range of velocities and trajectories.

In the embodiment illustrated, the base section 10 is cut away at the surface abutting the other base section 12, to provide with the latter section an annular groove in which to receive the annular ring end portion 32 of a support plate *or member* 34 which forms a part of the support assembly. The support plate projects radially from the axis of rotation of the tire and is spaced axially from the tire. The outer end of the plate supports an L-shaped bracket 36, as by means of a pair of bolts 38. In the preferred embodiment illustrated, the bolts extend through holes in the section of the bracket abutting the plate 34 and aligned holes 40 in said plate 34. A second pair of vertically aligned holes 40' also are provided in the plate 34. By this means the bracket 36 is adjustable vertically relative to the periphery of the tire to accommodate the throwing of balls of different diameters, as explained more fully hereinafter.

The section of the bracket 36 which extends across the rotational plane of the tire supports a fixed ball-engaging pad *or pad member* in a position aligned with the tire, *which is to say such is located in the general plane of the wheel member,* and spaced outwardly from the periphery of the latter a distance slightly less than the diameter of the ball to be thrown. In the preferred embodiment illustrated, the pad comprises a rectangular block of firm rubber 42 bonded to one surface of an arcuate backing plate 44. The curvature of the plate, and hence the curvature of the surface of the rubber pad facing the periphery of the tire, is convex, as illustrated.

However, the ball-engaging surface of the pad 42 may be angular, or it may be straight. In any case, it has been determined that the ball engaging surface of the pad must extend forwardly beyond its minimum spacing from the wheel 30, and that this forward extension must diverge from the wheel. To illustrate, if the forward end of the pad terminates at its minimum spacing from the wheel (as, for example, on a vertical line through the axis of rotation of wheel 30 in FIG. 2), a ball B projected therefrom will shoot upwardly at unpredictable angles, rather than on the desired delivery line 46.

Means is provided for directing a ball into the space between the surfaces of the rotating tire 30 and fixed pad 42. In the embodiment illustrated, a hollow cylinder 48 having an internal diameter slightly larger then the diameter of a ball to be thrown, is secured to a bracket carried by the L-shaped bracket 36. In the embodiment illustrated, the bracket includes a split ring end section 50 to which the cylinder 48 is secured, and an elongated, offset arm section 52 the terminal end portion of which overlies the bracket 36 and is secured removably thereto by such means as screw 54.

Means also is provided for supporting the foregoing assembly above the ground. In the embodiment illustrated, such means comprises an elongated shaft 56 secured at one end to the base section 10 and extending radially therefrom relative to the rotation axis of the wheel. The opposite end of the shaft extends freely into the central bore 58 of the hub 60 of a tripod base *or portable stand*. The hub supports three elongated legs 62 which diverge downwardly from the hub in tripod fashion, as will be understood.

FIGS. 1 and 2 illustrate an arrangement of the components for a ball throwing operation. In this condition the bottom end of the shaft 56 abuts the inner end of a set screw 64 which projects into the center bore 58 of the tripod base hub. By this means the shaft may rotate within the bore, whereby to allow an operator to rotate the wheel and pad assembly horizontally about the vertical axis of the shaft. A bale-type handle 66 projects from the bracket 36 for this purpose. In this manner the operator may cause the device to throw balls to various positions. A second set screw 68 in the hub 60 above the set screw 64 may be tightened against the shaft 56 to secure the device in desired positions of adjustment.

Further, the line 46 (FIG. 2) on which a ball is projected from between the tire 30 and pad 42 may be adjusted in a vertical plane, by rotating the plate 34 about the rotational axis of the wheel. *In the modification of the invention shown in FIGS. 1–3, the rotational axis of the wheel is the adjustment axis of plate or member 34.* To adjust the inclination of the projection line 46 the operator grasps the bale handle 66 and rotates the plate 34 about the axis of rotation of the wheel, by rotating the annular ring 32 within the annular groove provided between the sections 10 and 12 of the base member. The desired angle of inclination is secured by tightening a set screw 70 (FIG. 3) against the annular ring 32.

With the pad 42 disposed above the wheel, as indicated in full lines in FIG. 2 the device is best arranged for delivering baseball or softball pitches for batting practice. This arrangement of components provides for projection of the ball from the device with an underspin. By rotating the plate counterclockwise to incline the ball projection line 46, the device serves effectively to throw fly balls for outfield practice. It also is effective to throw lobs for batting practice, by reducing the rotational speed of the wheel 30.

For infield ground ball practice, it is desirable that the ball be thrown with overspin. This is achieved by rotating the plate 34 substantially 180° from the position illustrated in full lines in FIG. 2 to position the pad 42 below the wheel 30. In this position of adjustment, the delivery cylinder 48 would be located to the right of the supporting shaft 56 and the ball would be delivered toward the left. However, the direction of delivery toward the right in FIG. 2, as illustrated in broken lines, is achieved simply by rotating the wheel assembly 180° about the vertical axis of shaft 56.

Assuming that the device as illustrated is arranged for the throwing of baseballs, it is readily adjusted to accommodate the throwing of softballs. For this purpose a delivery cylinder of correspondingly larger internal diameter replaces the delivery cylinder 48 illustrated, by the simple expediency of removing the screw 54. The spacing between the periphery of tire 30 and pad 42 is increased by removing the bolts 38 from holes 40 and adjusting the pad radially outward from the tire to the appropriate distance at which the bolts 38 may enter holes 40, and thereafter retightening the bolts.

When it is desired to transport the device, the set screw 64 is retracted to allow the shaft 56 to move downward through the central bore 48 in the tripod base hub 60 until the set screw 68 registers with a detent 72 in the shaft 56. Upon tightening the set screw 68 the shaft is secured against rotation. The pair of tripod legs at the right in FIG. 2 thus are disposed in a plane perpendicular to the wheel 30 and may be used as a pair of handles by which to guide the device, with the wheel 30 rolling upon the ground, in wheel barrow fashion. An auxiliary handle 74 on the base section 10 facilitates lifting of the device into and from the trunk of a vehicle.

Figure 4:
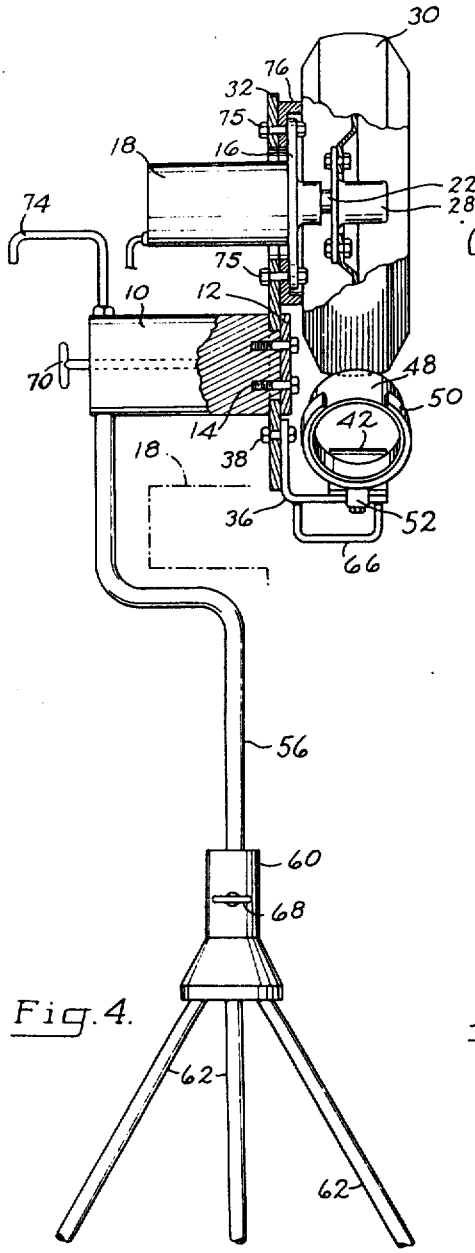
FIGS. 4 and 5 are fragmentary views, similar to FIG. 1, showing modified forms of the ball throwing device embodying the features of this invention.
Figure 5:
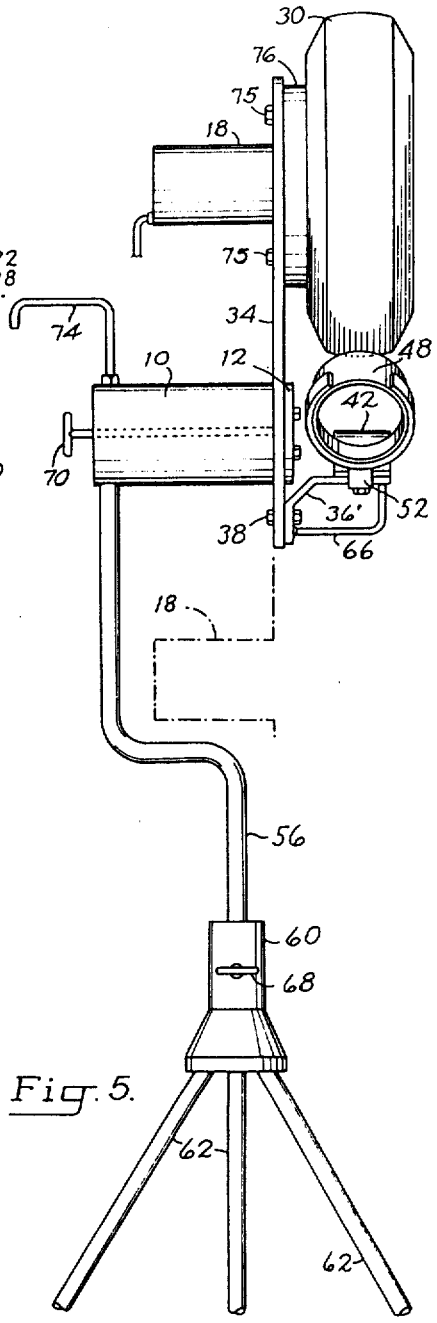

It is to be noted in FIGS. 1–3 that the axis of rotation of the support plate 34 within the groove provided between the base sections 10 and 12, is common to the axis of rotation of the wheel 30. FIGS. 4 and 5 illustrate structural arrangements by which the support plate 34 is rotated on an axis which is offset from but parallel to the axis of rotation of the wheel 30.

In FIG. 4, the wheel 30 is mounted on the output shaft 22 of the electric motor 18, the mounting flange 16 of which is secured, as by bolts 75 and spacer 76, to the support plate 34 radially outward of the rotational mounting of the plate 34 in the annular groove formed between the base sections 10 and 12, *which is to say that the wheel rotates about an axis disposed laterally of the adjustment axis of plate 34.*

The ball-engaging pad 42 also is mounted on the support plate 34 radially outward of the rotational mounting of the plate, diametrically opposite the wheel 30, as illustrated. However, it will be apparent that both the wheel 30 and the pad 42 may be mounted on the support plate 34 radially outward and to the same side of the rotational mounting of the plate 34 in the annular groove provided between the base sections 10 and 12.

It is to be noted, in FIG. 4, that the vertical shaft 56 is offset laterally intermediate its ends so as to accommodate the drive motor 18 during rotation of the support plate 34 about its annular mounting groove, while also moving the center of gravity of the upper assembly of wheel, pad and support assembly within the support periphery of the tripod legs 62, to insure stability of the assembly in operation.

In FIG. 5 the wheel 30 is mounted on the support plate 34 in the manner of FIG. 4, but farther outward from the rotational axis of the plate 34, and the pad 42 is mounted on the plate 34, by bracket 36', so that its transverse line of minimum spacing from the wheel 30 is located on the axis of rotation of the plate 34.

In FIG. 5, the vertical shaft 56 is offset laterally intermediate its ends in the same manner and for the same purpose as described previously in connection with FIG. 4.

Accordingly, in each of the embodimens illustrated in the drawings the wheel 30 and pad 42 are mounted upon relatively rotatable components of the support assembly which allow rotational adjustment by which to position the pad 42 selectively above and below the wheel 30, for the purpose described hereinbefore in connection with FIG. 2; namely, to project a ball B in the same direction from the device, either with an overspin or with an underspin. For this purpose, it will be understood that the wheel and pad and supporting assembly is rotated 180° about the vertical axis of the lower offset portion of the vertical shaft 56, by rotating the latter in the central bore 58 of the base hub 60, as previously explained.

From the foregoing it will be appreciated that the present invention provides a ball throwing device which is of simplified construction for economical manufacture and thus is affordable by schools and clubs for use by youngsters of pre-high school age, as well as the older age groups and individuals whose practice requirements do not include the throwing of curve balls.

It will be apparent to those skilled in the art that various changes may be made in the size, shape, type, number and arrangement of parts described hereinbefore, without departing from the spirit of this invention.

Having now described our invention and the manner in which it may be used, we claim:

1. A ball throwing device, comprising:

a. a support assembly including a base member, and a support member mounted on the base member for rotation and about a horizontal axis and having at least one portion thereof [projection] *projecting* radially outward from the base member for 180° selective rotational adjustment about said horizontal axis to opposite vertical sides of said axis, b. a rotary wheel having a ball-engaging surface, the wheel being mounted on the support assembly for rotation about an axis parallel to the said horizontal axis of rotational adjustment of the support member, c. drive means engaging the wheel for rotating the ball-engaging surface thereof in a ball throwing direction at a speed predetermined to project a ball therefrom at a selected velocity, d. a pad means mounted on the support member for rotation therewith about said horizontal axis, the pad means having a ball-engaging surface spaced radially from the ball-engaging surface of the wheel a distance slightly less than the diameter of a ball to be thrown for compressing a ball against the wheel, and e. means for supporting the base member for rotation about a vertical axis whereby to accommodate throwing of a ball in the same direction when the pad means is positioned above the wheel and when the pad means is positioned below the wheel f. said rotary wheel [on] *or* pad means being mounted on said at least one radially projecting portion of the support member for adjustment to opposite vertical sides of said horizontal axis of rotation.

2. The ball throwing device of claim 1 including lock means on the base member engageable with the support member for securing the latter in selected positions of rotational adjustment about said horizontal axis.

3. The ball throwing device of claim 1 including ball delivery means mounted for rotation with the pad *means* about said horizontal axis for introducing a ball into the space between the ball-engaging surfaces.

[4. The ball throwing device of claim 1 wherein the pad means is mounted on the support member radially outward of said horizontal axis and the rotary wheel is mounted for rotation on an axis coaxial with said horizontal axis.]

5. The ball throwing device of claim 1 wherein the pad means is mounted on the support member radially outward of said horizontal axis and the rotary wheel is mounted for rotation about an axis parallel to and spaced radially from said horizontal axis.

6. The ball throwing device of claim 1 wherein the ball-engaging surface of the pad means closest to the rotary wheel is disposed on said horizontal axis and the rotary wheel is mounted for rotation about an axis parallel to and spaced radially from said horizontal axis.

*7. A ball throwing device comprising:*

*a support assembly including a base member, and a support member mounted on the base member for rotation about a horizontal adjustment axis, at least a portion of said support member projecting radially outwardly from the base member and being movable over at least about 180° for selective rotational adjustment about said adjustment axis to diametrically opposite sides of said axis,*

*a rotary wheel having a ball-engaging surface, the wheel being mounted on the support assembly for rotation about said adjustment axis,*

*drive means engaging said wheel for rotating the ball-engaging surface thereof in a ball throwing direction,*

*pad means mounted on said radially projecting portion of the support member and being movable with adjustment of the support member to opposite sides of said adjustment axis, said pad means having a ball-engaging surface spaced radially from the ball-engaging surface of the wheel a distance less than the diameter of a ball to be thrown whereby such ball while passing between the ball-engaging surface of the pad means and the ball-engaging surface of the wheel is compressed against the wheel, ball delivery means also mounted on said radially projecting portion of the support member for introducing a ball into the space between the ball engaging surfaces of said rotary wheel and said pad means, and*

*means for supporting said base member, support member, wheel and pad means at an elevation above the ground including a portable stand, the ball throwing device being manually transportable.*

*8. A ball throwing device comprising:*

*a support assembly,*

*a ball-engaging rotatable wheel member having a ball-engaging surface extending circumferentially thereabout rotatably mounted on the support assembly with the wheel member occupying a substantially upright plane,*

*a ball-engaging pad member having a ball-engaging surface extending therealong mounted on said support assembly in substantially the plane of the wheel member and with the ball-engaging surface of the pad member spaced radially from the ball-engaging surface of the wheel member a distance slightly less than*

*the diameter of a ball to be thrown whereby a ball is compressed against the wheel member on passing between the wheel and pad members,*

*drive means engaging the wheel member for rotating the ball-engaging surface thereof in a ball throwing direction,*

*said support assembly including a base member and a support member rotatably mounted on said base member for rotation about a horizontal adjustment axis extending normal to the plane of the wheel member, said support member including a portion disposed radially outwardly of said adjustment axis movable over at least about 180° for selective rotational adjustment about said adjustment axis,*

*at least one of said ball-engaging members being mounted on said portion of said support member and located by said support member in a position disposed over the other ball-engaging member, and movement*

*of said portion of said support member over said 180° being effective to change the position of said one ball-engaging member from its position disposed over the other ball-engaging member to a position disposed under the said other ball-engaging member,*

*said support assembly further including a portable stand which supports said base member, support member and ball-engaging members at elevations disposed above the ground, the ball throwing device being manually transportable.*

*9. The ball throwing device of claim 8, wherein said pad member is mounted on said radially outwardly disposed portion of said support member, and which further includes ball delivery means mounted on said radially outwardly disposed portion of said support member for introducing a ball into the space between the ball-engaging surfaces of said wheel and pad members.*

* * * * *